(12) United States Patent
Chae et al.

(10) Patent No.: US 10,291,023 B2
(45) Date of Patent: May 14, 2019

(54) INVERTER DEVICE FOR MICROGRID, AND METHOD FOR CONTROLLING SAME

(71) Applicant: Korea Electric Power Corporation, Naju-si, Jeollanam-do (KR)

(72) Inventors: Woo-Kyu Chae, Daejeon (KR); Hak-Ju Lee, Daejeon (KR); Jong-Nam Won, Daejeon (KR); Il-Keun Song, Daejeon (KR); Jung-Sung Park, Daejeon (KR); Sung-Wook Hwang, Daejeon (KR)

(73) Assignee: KOREA ELECTRIC POWER CORPORATION, Naju-si, Jeollanam-do (KR)

( * ) Notice: Subject to any disclaimer, the term of this patent is extended or adjusted under 35 U.S.C. 154(b) by 0 days.

(21) Appl. No.: 15/758,156

(22) PCT Filed: Jul. 14, 2016

(86) PCT No.: PCT/KR2016/007690
§ 371 (c)(1),
(2) Date: Mar. 7, 2018

(87) PCT Pub. No.: WO2017/043750
PCT Pub. Date: Mar. 16, 2017

(65) Prior Publication Data
US 2018/0248371 A1    Aug. 30, 2018

(30) Foreign Application Priority Data
Sep. 9, 2015 (KR) .................. 10-2015-0127887

(51) Int. Cl.
*H02J 3/01* (2006.01)
*H02J 3/38* (2006.01)
(Continued)

(52) U.S. Cl.
CPC .................. *H02J 3/01* (2013.01); *H02J 3/38* (2013.01); *H02M 1/08* (2013.01); *H02M 1/12* (2013.01);
(Continued)

(58) Field of Classification Search
CPC ............. H02J 3/01; H02M 1/08; H02M 1/126
See application file for complete search history.

(56) References Cited

U.S. PATENT DOCUMENTS

| 5,384,696 A | * | 1/1995 | Moran | ...................... H02J 3/01 323/207 |
| 5,465,203 A | * | 11/1995 | Bhattacharya | ............ H02J 3/01 307/105 |

(Continued)

FOREIGN PATENT DOCUMENTS

| JP | 2008-228552 A | 9/2008 |
| JP | 2014-107962 A | 6/2014 |
| KR | 10-1083867 B1 | 11/2011 |
| KR | 2012-0102367 A | 9/2012 |

(Continued)

OTHER PUBLICATIONS

International Search Report dated Oct. 20, 2016 issued in International Patent Application No. PCT/KR2016/007690 (with English translation).

(Continued)

*Primary Examiner* — Jue Zhang
*Assistant Examiner* — Kevin H Sprenger
(74) *Attorney, Agent, or Firm* — Morgan Lewis & Bockius LLP (57) ABSTRACT

The present invention relates to an inverter device for a microgrid, and a method for controlling the same, the inverter device including: a waveform detector detecting a voltage waveform and a current waveform applied to a load; a control unit determining whether a sine wave appears based on the detected voltage waveform and the detected current waveform and performing voltage control or low (Continued)

order harmonic compensation depending on a determination result; and a switch generating a voltage waveform in a form of the sine wave by being turned on/off depending on a control signal received from the control unit and supplying the generated voltage waveform in the form of the sine wave to the load.

11 Claims, 8 Drawing Sheets

(51) Int. Cl.
*H02M 1/08* (2006.01)
*H02M 1/12* (2006.01)
*H02M 1/00* (2006.01)
*H02M 7/5395* (2006.01)

(52) U.S. Cl.
CPC ............ *H02M 1/126* (2013.01); *H02J 3/381* (2013.01); *H02M 7/5395* (2013.01); *H02M 2001/0003* (2013.01); *H02M 2001/0009* (2013.01)

(56) References Cited

U.S. PATENT DOCUMENTS

| | | | |
|---|---|---|---|
| 2010/0320949 A1* | 12/2010 | Fotherby | H02M 7/48 318/400.26 |
| 2016/0094149 A1* | 3/2016 | Pahlevaninezhad | H02M 1/126 363/97 |
| 2016/0248341 A1* | 8/2016 | Trainer | H02M 7/483 |
| 2017/0237364 A1* | 8/2017 | Safamehr | H02M 7/53871 363/40 |

FOREIGN PATENT DOCUMENTS

| | | |
|---|---|---|
| KR | 10-1281079 B1 | 7/2013 |
| KR | 10-1320868 B1 | 10/2013 |

OTHER PUBLICATIONS

K-W Kim, et al., "Advanced Synchronous Reference Frame Controller for Three-Phase UPS Powering Unbalanced and Nonlinear Loads," Transaction of the Korean Institute of Power Electronics vol. 10, No. 5, The Korean Institute of Power Electronics, Oct. 2015, pp. 508-517.

* cited by examiner

INVERTER DEVICE FOR MICROGRID, AND METHOD FOR CONTROLLING SAME

RELATED APPLICATIONS

This application is the U.S. National Phase under 35 U.S.C. § 371 of International Application No. PCT/KR2016/007690, filed on Jul. 14, 2016 which in turn claims the benefit of Korean Patent Application No. 10-2015-0127887 filed on Sep. 9, 2015, the disclosures of which applications are incorporated by reference herein.

TECHNICAL FIELD

The present invention relates to an inverter device for a microgrid, and a method for controlling the same. More particularly, the present invention relates to an inverter device for a microgrid, and a method for controlling the same so as to prevent distortion of a voltage waveform when supplying a non-linear load and an unbalanced load in a stand-alone microgrid, which is a small-scale power supply system.

BACKGROUND ART

A stand-alone microgrid is a small-scale power supply system composed of a wind power generator, a solar power generator, an inverter, a battery, a diesel generator, etc. The main different between the stand-alone microgrid and a conventional power station is that which equipment maintains a voltage and a frequency of an electric power system. In the conventional power station, a power generator maintains the voltage and the frequency of the electric power system, and in the stand-alone microgrid, the inverter maintains the voltage and the frequency.

In the small-scale power supply system, electric power system impedance is relatively large, compared to a large electric power system, and thus depending on the type of the load, a voltage waveform is easily distorted or voltage inequality often occurs. Also, since the inverter of the stand-alone microgrid does not take this phenomenon into consideration, voltage quality is degraded or is not enhanced.

The inverter of the stand-alone microgrid controls the voltage and the frequency to be constantly maintained regardless of the magnitude and type of the supplied load. Here, when the generated voltage waveform is similar to a complete sine wave, voltage quality is good. To this end, conventionally, a voltage controller of the inverter is used as a synchronous reference frame proportional-integral voltage controller (hereinafter, referred to as a PI controller). Here, the PI (Proportional and Integral) controller is simple in structure and is easily realized, and when supplying a three-phase balanced load, the result of synchronous reference frame conversion of a three-phase voltage is a DC component, and thus voltage control (a voltage waveform similar to a sine wave) without an error is possible. However, in the PI controller, when the non-linear load or the unbalanced load is supplied, an unbalanced and harmonic component occurs between three-phase voltages, and a synchronous reference frame d-q axis voltage contains a ripple component, and thus a steady-state error of the voltage can be eliminated. That is, the voltage supplied to the load is distorted, which may cause damage and malfunction in an important load.

In this regard, there is Korean Patent Application Publication No. 10-2010-0102357, titled "a current control apparatus of a distribution static compensator considering a non-linear load."

DISCLOSURE

Technical Problem

The present invention has been made keeping in mind the above problems occurring in the related art, and the present invention is intended to provide an inverter device for a microgrid, and a method for controlling the same that includes a resonant controller for supplying a stable voltage when a non-linear load and an unbalanced load are supplied.

Also, the present invention is intended to provide an inverter device for a microgrid, and a method for controlling the same that includes a proportional current controller capable of limiting a current output from an inverter to a rating.

Technical Solution

In order to accomplish the above object, there is provided an inverter device for a microgrid according to the present invention, the inverter device including: a waveform detector detecting a voltage waveform and a current waveform applied to a load; a control unit determining whether a sine wave appears based on the detected voltage waveform and the detected current waveform and performing voltage control or low order harmonic compensation depending on a determination result; and a switch generating a voltage waveform in a form of the sine wave by being turned on/off depending on a control signal received from the control unit and supplying the generated voltage waveform in the form of the sine wave to the load.

Also, the control unit may include: a load type determination unit determining that a type of the load is a fundamental wave when determining the sine wave appears in the detected voltage waveform and the detected current waveform, and determining that the type of the load is one of an unbalanced load and a non-linear load when determining the sine wave does not appear; a proportional-resonant controller controlling a voltage when being determined as the fundamental wave; and a resonant controller compensating for a low order harmonic when being determined as the unbalanced load and the non-linear load.

Also, the proportional-resonant controller may include: a first proportional-resonant controller controlling the voltage of a linear load due to the fundamental wave; and a second proportional-resonant controller controlling the voltage of the unbalanced load due to the fundamental wave.

Also, the resonant controller may include: a first resonant controller compensating for a third order harmonic due to the unbalanced load; a second resonant controller compensating for a fifth order harmonic due to the non-linear load; and a third resonant controller compensating for a seventh order harmonic due to the non-linear load.

Also, the control unit may further include a current limiting unit calculating an output current based on an output voltage and limiting the output current when the calculated output current exceeds a preset reference current.

Also, the inverter device may further include a gate driver controlling on/off of the switch based on the control signal from the control unit in consequence of performing voltage control or low order harmonic compensation.

Also, the inverter device may further include a filter removing a harmonic component from the generated voltage waveform in the form of the sine wave in the switch.

Also, the inverter device may further include a transformer detecting a magnitude of the voltage supplied from the filter and transforming the detected voltage to a preset reference voltage.

In order to accomplish the above object, there is provided a method for controlling an inverter device for a microgrid according to the present invention, the method including: detecting, by a waveform detector, a voltage waveform and a current waveform applied to a load; determining, by a control unit, whether a sine wave appears based on the detected voltage waveform and the detected current waveform and performing voltage control or low order harmonic compensation depending on a determination result; and generating, by a switch, a voltage waveform in a form of the sine wave by being turned on/off depending on a control signal received from the control unit and supplying the generated voltage waveform in the form of the sine wave to the load.

Also, the determining of whether the sine wave appears based on the detected voltage waveform and the detected current waveform and the performing of the voltage control or low order harmonic compensation depending on the determination result may include: determining that a type of the load is a fundamental wave when determining the sine wave appears in the detected voltage waveform and the detected current waveform, and determining that the type of the load is one of an unbalanced load and a non-linear load when determining the sine wave does not appear; controlling a voltage when being determined as the fundamental wave; and compensating for a low order harmonic when being determined as the unbalanced load and the non-linear load.

Also, at the controlling of the voltage, the voltage may be controlled in a case of a linear load due to the fundamental wave and in a case of the unbalanced load due to the fundamental wave.

Also, at the compensating for the low order harmonic, a third order harmonic may be compensated for in a case of the unbalanced load, and a fifth order harmonic or a seventh order harmonic may be compensated for in a case of the non-linear load.

Also, after the determining of whether the sine wave appears based on the detected voltage waveform and the detected current waveform and the performing of the voltage control or low order harmonic compensation depending on the determination result, the method may further include calculating an output current based on an output voltage output from the control unit, and limiting the output current when the calculated output current exceeds a preset reference current.

Advantageous Effects

According to the present invention with the above-described configuration, in the inverter device for a microgrid and the method for controlling the same, the proportional-resonant controller is applied when the linear load is supplied, and the resonant controller is applied when the non-linear load and the unbalanced load are supplied, whereby compensation for distortion of a voltage waveform can be performed when the non-linear load and the unbalanced load are supplied.

Also, the present invention provides the proportional current controller capable of limiting the current output from the inverter to a rating, whereby a power failure of the inverter can be prevented.

MODE FOR INVENTION

Hereinafter, the most preferred embodiment of the present invention will be described with reference to the accompanying drawings in order to describe the present invention in detail so that the technical spirit of the present invention can be easily embodied by those skilled in the art to which the present invention belongs. First, it is to be noted that in assigning reference numerals to elements in the drawings, the same reference numerals designate the same elements throughout the drawings although the elements are shown in different drawings. In addition, in the description of the present disclosure, the detailed descriptions of known related constitutions or functions thereof may be omitted if they make the gist of the present invention unclear.

Figure 1:
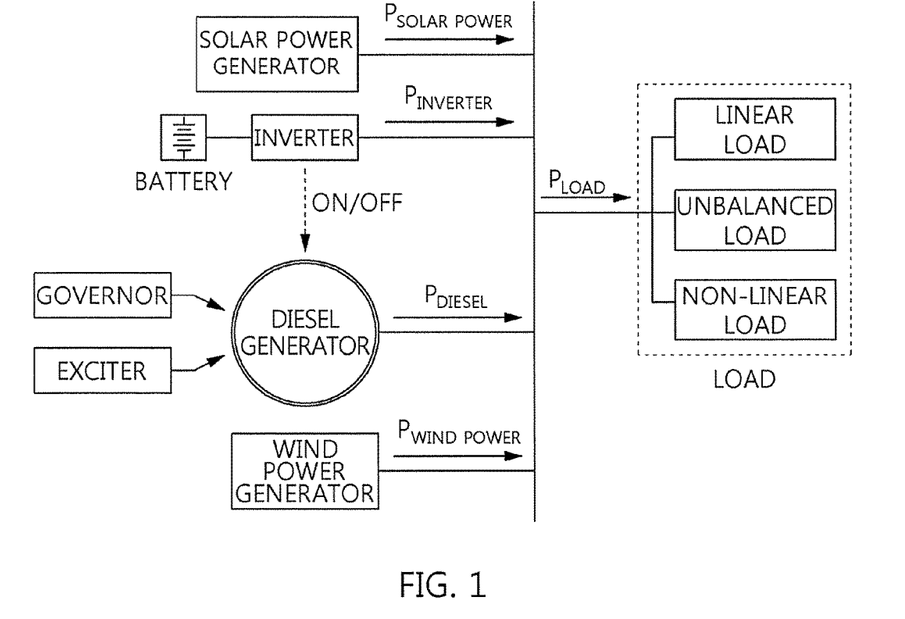
FIG. 1 is a view illustrating a structure of a stand-alone microgrid according to the present invention.

FIG. 1 is a view illustrating a structure of a stand-alone microgrid according to the present invention.

Referring to FIG. 1, the stand-alone microgrid according to the present invention is composed of a renewable energy system, such as a wind power generator, a solar power generator, etc., and a battery, an inverter, a diesel generator, etc. Here, power is supplied as being connected to a load. The load has a linear load, an unbalanced load, and a non-linear load depending on its type. The linear load is a common motor, a display device, etc., the unbalanced load occurs mainly when the load is not evenly connected in phase in a three-phase system, and the non-linear load is an electronic product, such as a computer or a washing machine, wherein a switching element is used therein.

The stand-alone microgrid is a small-scale power supply system in which the power generated by the renewable energy system, etc. is supplied to the load first and the battery is charged with the remaining power using the inverter. Here, depending on the magnitude thereof and the type of the load, when the voltage waveform is not a complete sine wave, the unbalanced voltage where the magnitude of voltage varies by phase occurs.

Figure 2:
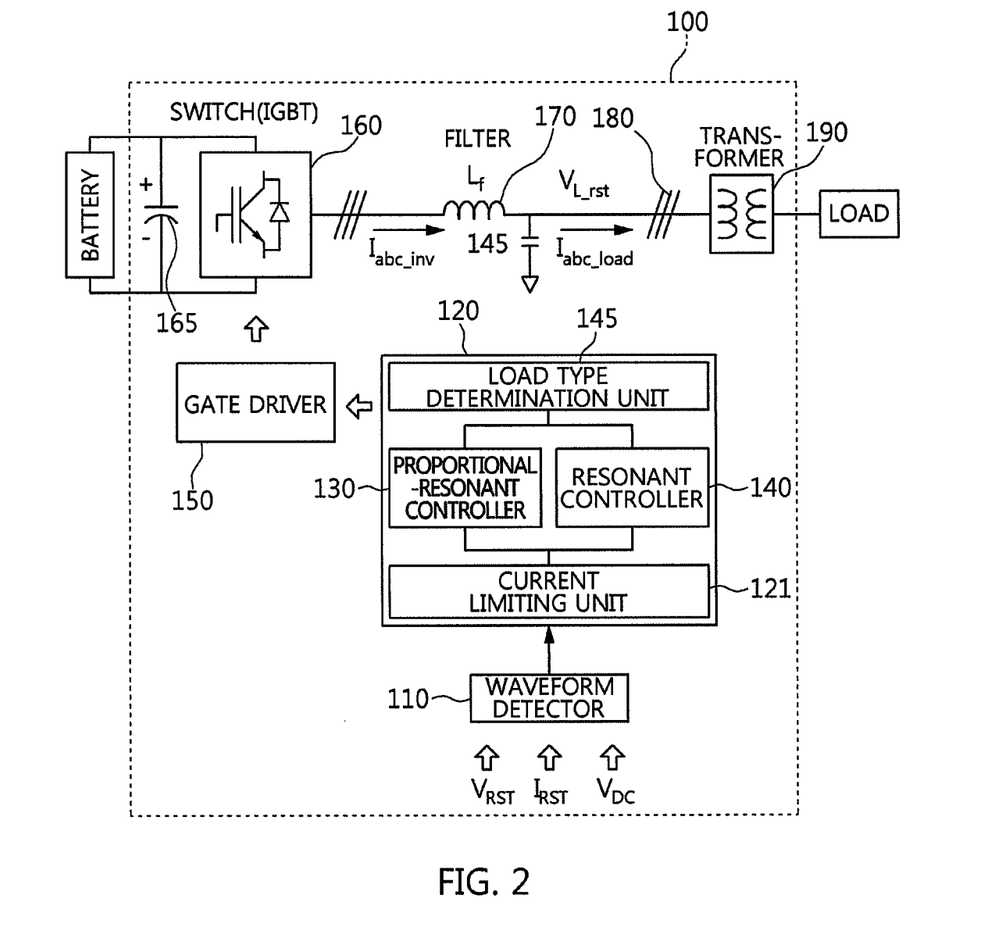
FIG. 2 is a view illustrating the configuration of an inverter device for a microgrid according to the present invention.

FIG. 2 is a view illustrating the configuration of an inverter device for a microgrid according to the present invention.

Referring to FIG. 2, the inverter device 100 for a microgrid (hereinafter, referred to as an inverter device) according to the present invention includes a waveform detector 110, a control unit 120, a gate driver 150, a switch 160, a DC storage element 165 (DC Link), a filter 170, a magnetic contactor 180, and a transformer 190.

The waveform detector 110 detects a voltage waveform and a current waveform applied to the load.

The control unit 120 determines whether a sine wave appears based on the detected voltage waveform and current waveform, and performs voltage control or low order harmonic compensation depending on the determination result.

To this end, the control unit 120 includes a load type determination unit 121, a proportional-resonant controller 130, a resonant controller 140, and a current limiting unit 145.

The load type determination unit 121 determines that the type of the load is the fundamental wave when determining a sine wave appears in the detected voltage waveform and current waveform. The load type determination unit determines that the type of the load is one of the unbalanced load and the non-linear load when determining the sine wave does not appear.

The proportional-resonant controller 130 controls the voltage when being determined as the fundamental wave.

The proportional-resonant controller 130 controls the voltage to supply a stable voltage for 60 Hz component of a stationary reference frame.

The resonant controller 140 compensates for low order harmonics when being determined as the unbalanced load and the non-linear load. Here, the low order harmonics are the third, fourth, and seventh order harmonics The resonant controller 140 compensates for voltage distortion of the third order harmonic component that noticeably appears at three-phase load voltage in the case of the unbalanced load, and compensates for voltage distortion of the fifth and seventh order harmonic components that noticeably appears at the three-phase load voltage in the case of the non-linear load.

The current limiting unit 145 calculates an output current based on an output voltage, and limits the output current when the calculated output current exceeds a preset reference current so as to prevent overload in the inverter device. Here, the current limiting unit 145 may be realized as a proportional current controller, and may operate separately or in combination as required.

The gate driver 150 controls on/off of the switch based on a control signal (PWM: pulse width modulation) from the control unit 120 in consequence of performing voltage control or low order harmonic compensation.

The switch 160 is turned on/off depending on the control signal of the gate driver 150 such that a voltage waveform in the form of a sine wave is generated, and the generated voltage waveform in the form of a sine wave is supplied to the load. That is, the distortion and unbalanced state of the waveform generated by the switch 160 are determined depending on which control signal is generated by the control unit 120.

The switch 160 may convert a commercial AC power to a DC power, or conversely, may convert a DC power stored in the DC storage element to an AC power.

The DC storage element 165 instantly stores the power converted by the switch 160, or instantly stores the DC power such that the switch 160 can convert the DC power to the AC power.

The filter 170 removes a harmonic component from the generated voltage waveform in the form of a sine wave in the switch 160 such that a waveform more similar to a sine wave is generated.

The magnetic contactor 180 electrically connects or disconnects the inverter device according to the present invention and the load.

The transformer 190 detects the magnitude of voltage supplied from the filter 170, and transforms the detected voltage to a preset reference voltage. That is, when the detected voltage is lower or higher than the preset reference voltage, the transformer 190 raises or lowers the voltage in accordance with the preset reference voltage.

In the meantime, the battery at the left is not included in the inverter device according to the present invention, but stores electric energy through electric connection.

Figure 3:
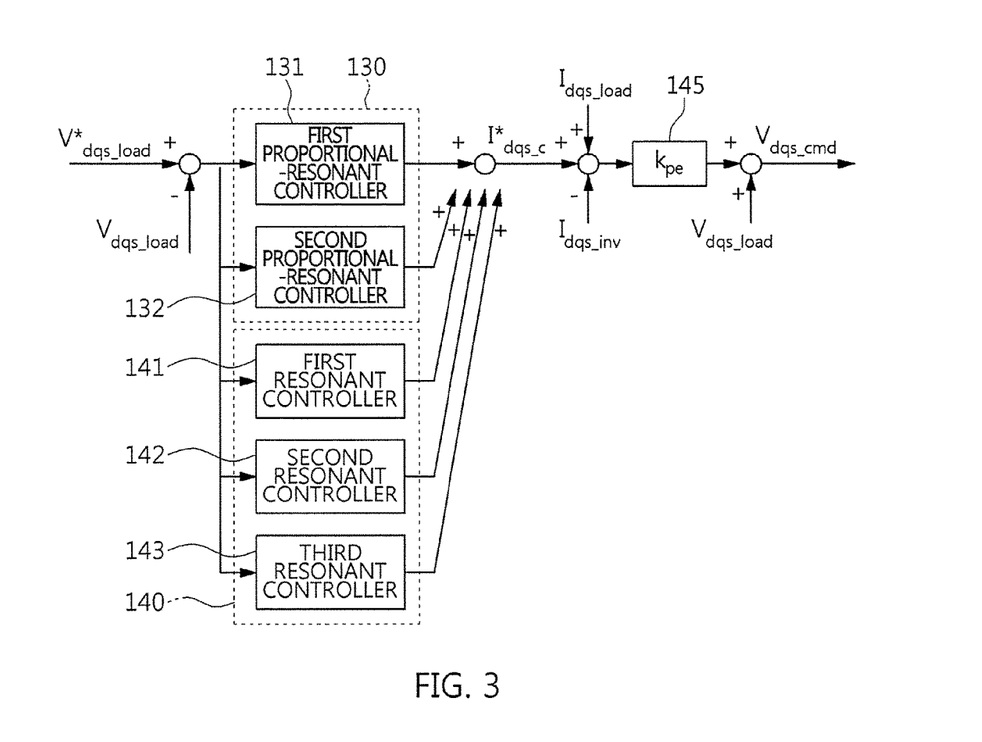
FIG. 3 is a view illustrating the detailed configuration of a control unit of an inverter device for a microgrid according to the present invention.

FIG. 3 is a view illustrating the detailed configuration of a control unit of an inverter device for a microgrid according to the present invention.

Referring to FIG. 3, the control unit 120 according to the present invention determines whether the sine wave appears based on the detected voltage waveform and current waveform, and, as described above, includes the load type determination unit 121, the proportional-resonant controller 130, the resonant controller 140, and the current limiting unit 145 in order to perform voltage control or low order harmonic compensation depending on the determination result. However, the configurations of only the proportional-resonant controller 130, the resonant controller 140, and the current limiting unit 145 will be described in detail with the reference to the drawing.

The proportional-resonant controller 130 controls the voltage when being determined as the fundamental wave by the load type determination unit 121.

To this end, the proportional-resonant controller 130 includes a first proportional-resonant controller 131 and a second proportional-resonant controller 132.

The first proportional-resonant controller 131 controls the voltage $k_{pv}$ of the linear load due to the fundamental wave.

The second proportional-resonant controller 132 controls the voltage of the unbalanced load due to the fundamental wave.

T voltage control function of the second proportional-resonant controller 132 is $$\frac{k_1 \omega_c s}{s^2 + 2\omega_c s + (\omega 1)^2}.$$

The resonant controller 140 compensates for the low order harmonic when being determined as the unbalanced load and the non-linear load by the load type determination unit 121.

To this end, the resonant controller 140 includes a first resonant controller 141, a second resonant controller 142, and a third resonant controller 143.

The first resonant controller 141 compensates for the third order harmonic due to the unbalanced load.

A harmonic compensation function of the first resonant controller 141 is $$\frac{k_3 \omega_c s}{s^2 + 2\omega_c s + (\omega 3)^2}.$$

The second resonant controller 142 compensates for the fifth order harmonic due to the non-linear load.

A harmonic compensation function of the second resonant controller 142 is $$\frac{k_5 \omega_c s}{s^2 + 2\omega_c s + (\omega 5)^2}.$$

The third resonant controller 143 compensates for the seventh order harmonic due to the non-linear load.

A harmonic compensation function of the third resonant controller 143 is $$\frac{k_7 \omega_c s}{s^2 + 2\omega_c s + (\omega 7)^2}.$$

In this way, a transfer function $G_{PR(S)}$ of the proportional-resonant controller 130 and the resonant controller 140 may be expressed by the following Formula 1.

$$G_{PR(S)} = k_{pv} + \frac{k_1 \omega_c s}{s^2 + 2\omega_c s + (\omega 1)^2} + \frac{k_3 \omega_c s}{s^2 + 2\omega_c s + (\omega 3)^2} + \frac{k_5 \omega_c s}{s^2 + 2\omega_c s + (\omega 5)^2} + \frac{k_7 \omega_c s}{s^2 + 2\omega_c s + (\omega 7)^2} \quad \text{[Formula 1]}$$

Here, $\omega_c$ is a cutoff frequency, $\omega 1$ is approximately 377 rad/s, $\omega 3$ is approximately 1131 rad/s, $\omega 5$ is approximately 1885 rad/s, and $\omega 7$ is approximately 2640 rad/s.

The current limiting unit 145 generates a reference value $I^*_{dqs'inv}$ of the current of the inverter device adding a current $I_{dps'load}$ supplied to the load to a reference value $I^*_{dps'c}$ of a capacitor current generated from the proportional-resonant controller 130 and the resonant controller 140, and generates an error value subtracting an actual current $I_{dqs'inv}$ flowing in the inverter device from the reference value $I^*_{dqs'inv}$ of the current of the inverter device. The generated error value is multiplied by a proportional constant $K_{pc}$ such that the final control value is output.

This may be expressed by the following Formula 2.

$$K_{pc}(I^*_{dps'c} + I_{dps'load} - I_{dqs'inv}) \quad \text{[Formula 2]}$$

Figure 4:
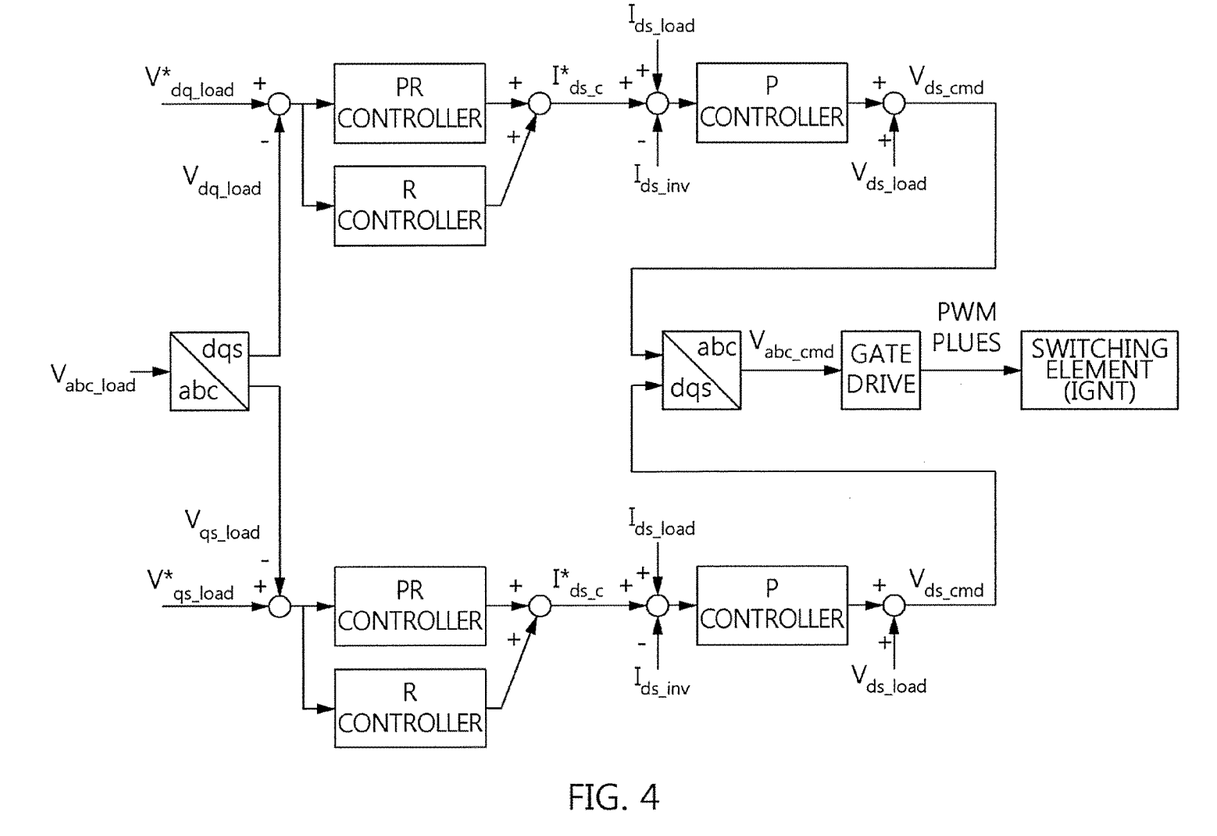
FIG. 4 is a view illustrating a structure where a control unit of an inverter device for a microgrid is divided with respect to a d-axis and a q-axis according to the present invention.

FIG. 4 is a view illustrating a structure where a control unit of an inverter device for a microgrid is divided with respect to a d-axis and a q-axis according to the present invention.

Referring to FIG. 4, in structure where the control unit according to the present invention is divided with respect to a d-axis and a q-axis, the measured three-phase voltage $V_{abc'load}$ is converted into a d-axis voltage $V_{ds'load}$ and a q-axis voltage $V_{qs'load}$ of a synchronous reference frame. Here, the synchronous reference frame is a stationary reference frame where the coordinate axes do not rotate, and the stationary reference frame is designated by the symbol s in the drawing. Conversion to the synchronous reference frame is expressed by the following Formula 3.

$$\begin{bmatrix} V_{ds} \\ V_{gs} \\ V_0 \end{bmatrix} = \frac{2}{3} \begin{bmatrix} 1 & \cos\frac{2}{3}\pi & \cos\frac{2}{3}\pi \\ 0 & \sin\frac{2}{3}\pi & -\sin\frac{2}{3}\pi \\ \frac{1}{2} & \frac{1}{2} & \frac{1}{2} \end{bmatrix} \begin{bmatrix} V_a \\ V_b \\ V_c \end{bmatrix} = V_{peak} \begin{bmatrix} \sin\theta \\ -\cos\theta \end{bmatrix} \quad \text{[Formula 3]}$$

The converted value is subtracted from the d and p-axes reference voltages $V^*_{ds'load}$ and $V^*_{qs'load}$ such that error values $V_{ds'err}$ and $V_{qs'err}$ are generated, and the error values pass through the proportional-resonant controller and the resonant controller, respectively, such that d-axis and q-axis command values $I^*_{ds'c}$ and $I^*_{qs'c}$ are generated.

Here, the d-axis voltage $V_{ds'load}$ and the q-axis voltage $V_{qs'load}$ are added thereto such that voltage command values $V_{ds'cmd}$ and $V_{qs'cmd}$ corresponding to the d-axis and q-axis components of the inverter device are generated finally. The voltage command values are inversely converted to the three-phase voltage such that a command value $V_{abc'cmd}$ three-phase voltage is generated. Thus, the gate driver generates the control signal based on the command value and controls the switch appropriately such that the three-phase voltage is generated in the inverter device.

Figure 5:
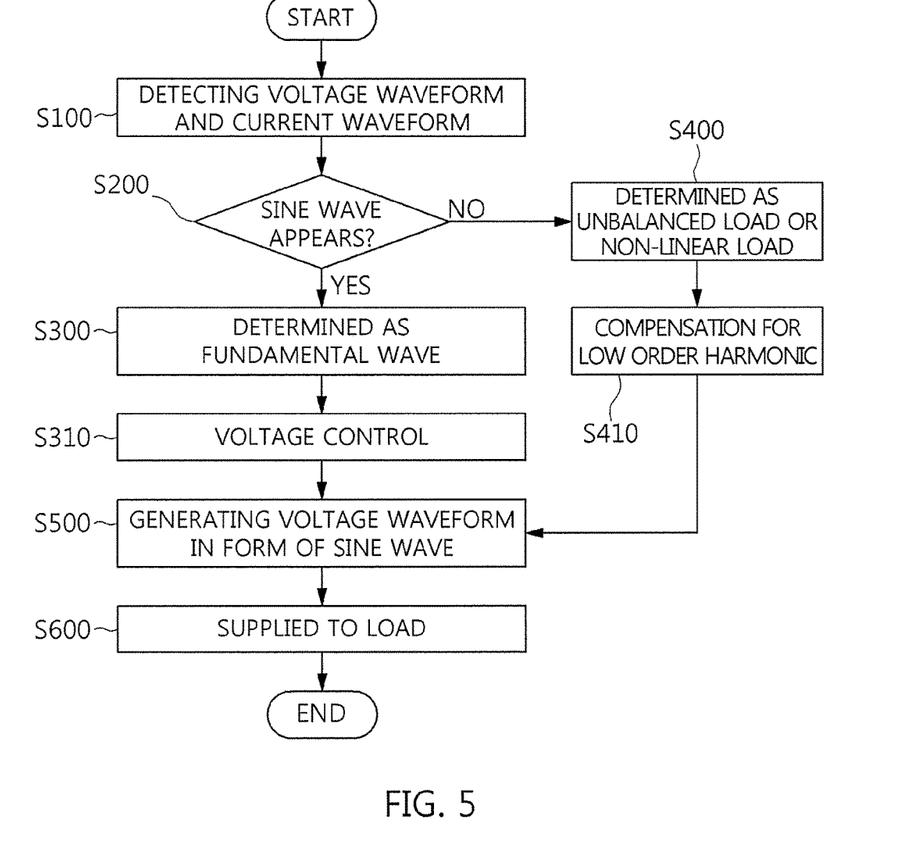
FIG. 5 is a flowchart illustrating a method for controlling an inverter device for a microgrid according to the present invention.

FIG. 5 is a flowchart illustrating a method for controlling an inverter device for a microgrid according to the present invention.

Referring to FIG. 5, since the method for controlling the inverter device for a microgrid according to the present invention uses the inverter device for a microgrid as described above, a repeated description thereof will be omitted.

First, the voltage waveform and the current waveform applied to the load are detected at step S100.

Next, based on the detected voltage waveform and current waveform, whether a sine wave appears is determined at step S200.

Next, when determining the sine wave appears in the detected voltage waveform and current waveform at step S200, the type of the load is determined as the fundamental wave at step S300.

Next, when being determined as the fundamental wave, the voltage is controlled at step S310.

When determining the sine wave does not appear at step S200, the type of the load is determined as one of the unbalanced load and the non-linear load at step S400.

Next, when being determined as the unbalanced load and the non-linear load, compensation for the low order harmonic is performed at step S410.

Next, when voltage control at step S310 is completed and compensation for the low order harmonic at step S410 is completed, a voltage waveform in the form of a sine wave is generated by the switch at step S500 and the generated voltage waveform in the form of a sine wave is supplied to the load at step S600.

Figure 6:
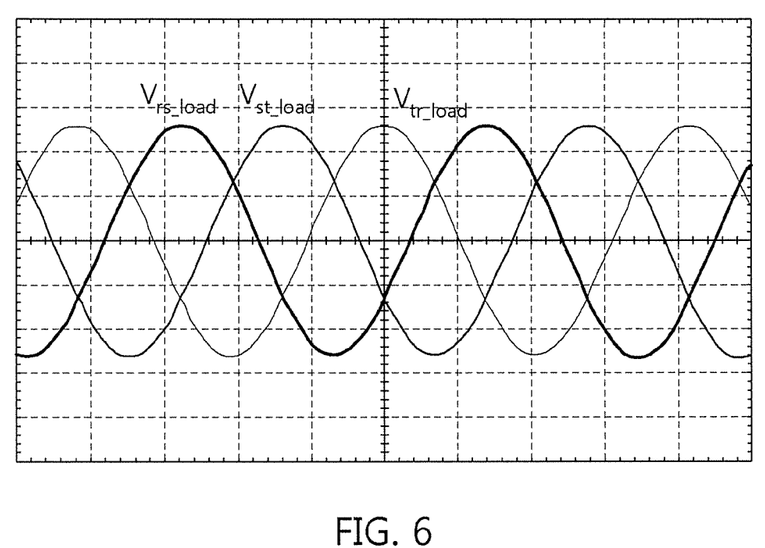
FIG. 6 is a view illustrating a linear load supply waveform of an inverter device for a microgrid according to the present invention.

FIG. 6 is a view illustrating a linear load supply waveform of an inverter device for a microgrid according to the present invention.

FIG. 6 shows an experimental waveform when a linear load of 30 kW is supplied using the inverter device according to the present invention. A phase-to-phase voltage in three-phases is controlled to 380 $V_{LL}$, and THD of the phase-to-phase voltage is maintained at 1.2%, such that a stable high-quality voltage is supplied to the load. Since the three-phase linear load, voltage distortion occurring in the case of the non-linear or unbalanced load is not seen.

Figure 7:
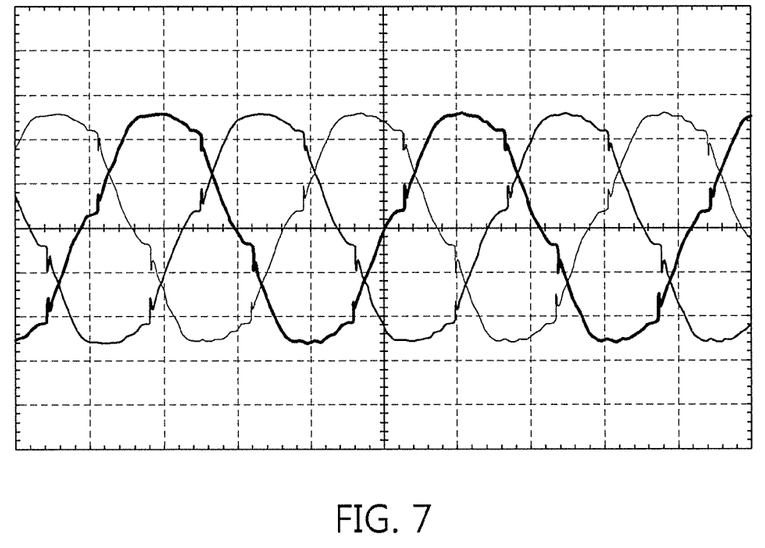
FIG. 7 is a view illustrating a non-linear load supply waveform of a conventional inverter.

FIG. 7 is a view illustrating a non-linear load supply waveform of a conventional inverter.

FIG. 7 shows an experimental waveform when a non-linear load of 5 kW is supplied using a conventional inverter. A phase-to-phase voltage in three-phases is distorted to (6n+1)-th order harmonic component due to the non-linear load. Here, fifth and seventh order harmonic components appear noticeably. The voltage waveform is not a sine wave but it is extremely distorted. Here, THD of the phase-to-phase voltage is 7.6%.

Figure 8:
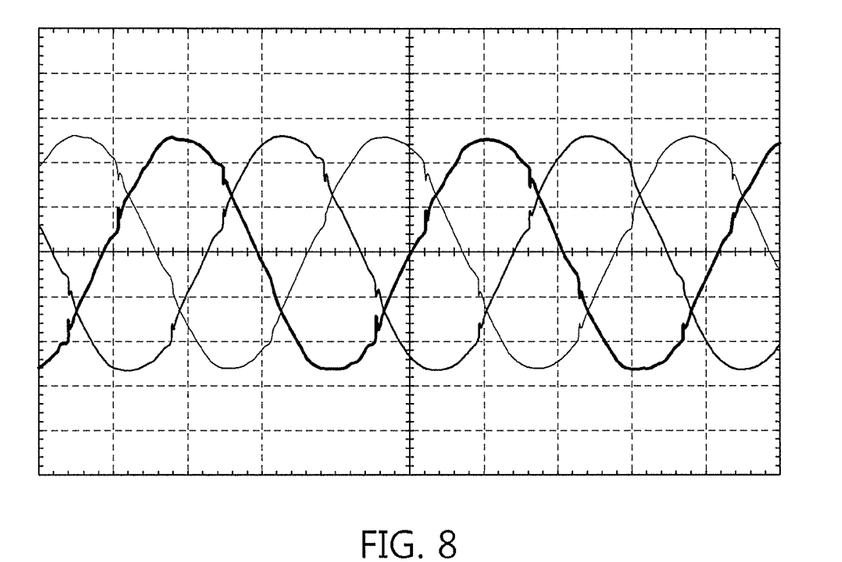
FIG. 8 is a view illustrating a non-linear load supply waveform of an inverter device for a microgrid according to the present invention.

FIG. 8 is a view illustrating a non-linear load supply waveform of an inverter device for a microgrid according to the present invention.

FIG. 8 shows an experimental waveform when a non-linear load of 5 kW is supplied using the inverter device according to the present invention under the same condition as FIG. 7. Compared to FIG. 7, the waveform is noticeably similar to a sine wave. That is, in the inverter device according to the present invention, fifth and seventh order harmonics are suppressed, and thus THD of the voltage is 3.5%, whereby a stable high-quality voltage with three-phase balance can be supplied to the load.

Figure 9:
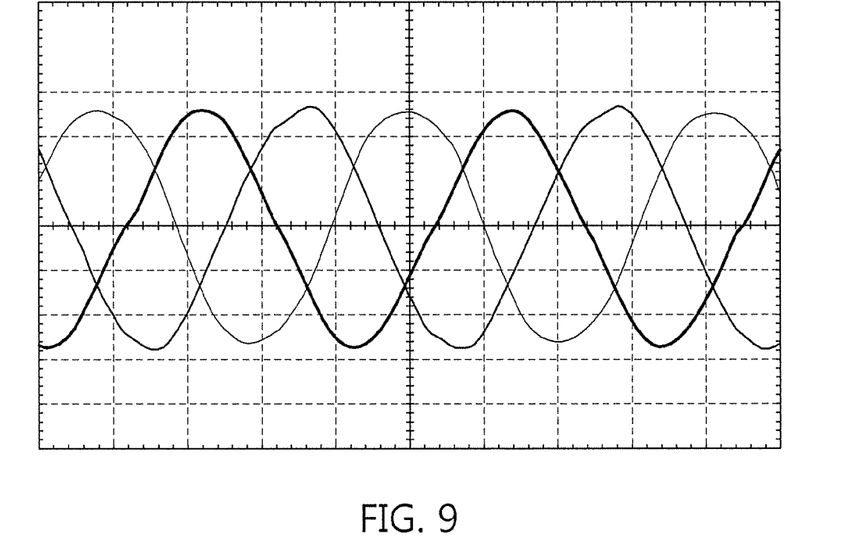
FIG. 9 is a view illustrating an unbalanced load supply waveform of a conventional inverter.

FIG. 9 is a view illustrating an unbalanced load supply waveform of a conventional inverter.

FIG. 9 shows an experimental waveform when an unbalanced load of 10 kW is supplied using the conventional inverter. The voltage waveform is more distorted with respected to a sine wave, and the magnitude of the voltage varies by phase. Here, the voltage unbalanced rate is 2.2%.

Figure 10:
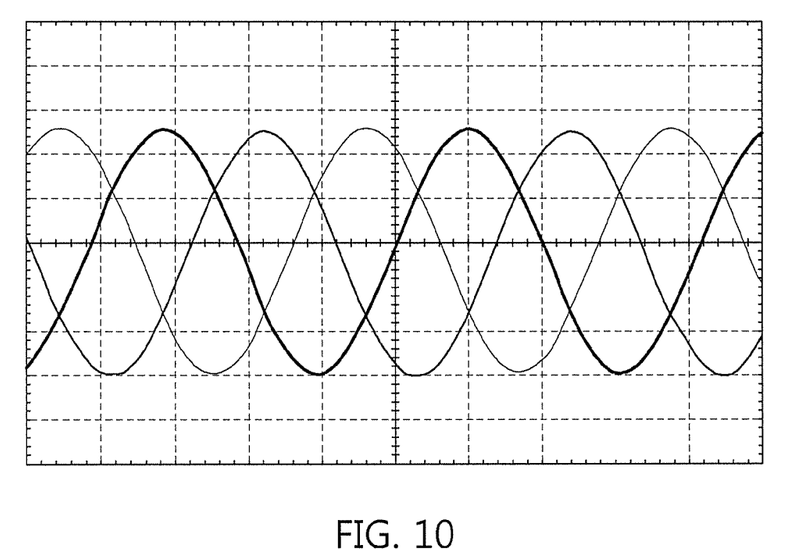
FIG. 10 is a view illustrating an unbalanced load supply waveform of an inverter device for a microgrid according to the present invention.

FIG. 10 is a view illustrating an unbalanced load supply waveform of an inverter device for a microgrid according to the present invention.

FIG. 10 shows an experimental waveform when an unbalanced load of 10 kW is supplied using the inverter device according to the present invention. Compared to FIG. 9, the waveform is noticeably similar to a sine wave. A phase-to-phase voltage in three-phases is controlled to 380 $V_{LL}$, and the unbalanced rate is 0.8%. Thus, voltage unbalanced caused by the unbalanced load is suppressed, such that a phase-to-phase voltage in three-phases is controlled to a balanced voltage. Also, a harmonic component occurs due to the unbalanced load is suppressed, such that the voltage THD of the load is maintained at 1.4%, whereby a stable high-quality voltage can be supplied to the load.

Figure 11:
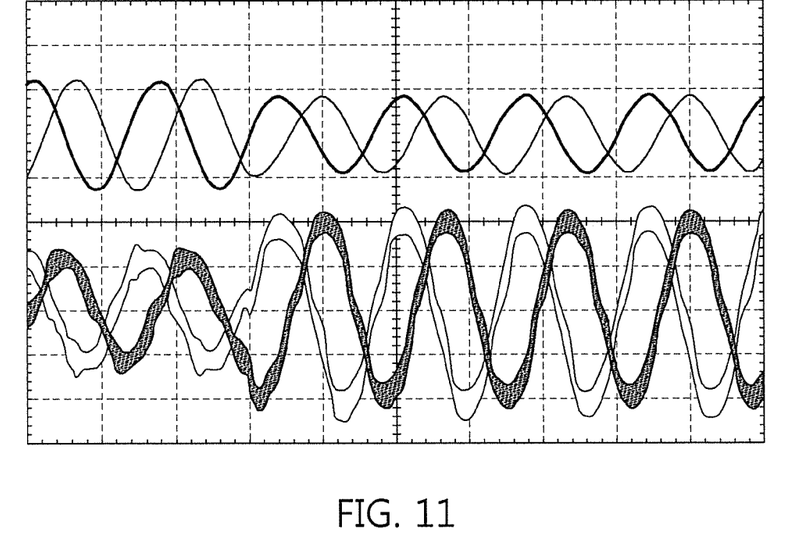
FIG. 11 is a view illustrating an experimental waveform for current limitation of an inverter device for a microgrid according to the present invention.

FIG. 11 is a view illustrating an experimental waveform for current limitation of an inverter device for a microgrid according to the present invention.

FIG. 11 shows an experimental waveform when current limitation is controlled using the inverter device according to the present invention. In the present invention, when the power applied to the system is out of the allowable power, the magnitude of the voltage controlled to 220 $V_{LL}$ is reduced, such that the current is output at the set limit value. That is, even when the magnitude of the load suddenly fluctuates, only the magnitude of the voltage is reduced and current limitation is performed rather than power failure occurring.

Also, in the inverter device for a microgrid, and the method for controlling the same according to the present invention, the proportional-resonant controller is applied when the linear load is supplied, and the resonant controller is applied when the non-linear load and the unbalanced load are supplied, whereby compensation for distortion of the voltage waveform may be performed when the non-linear load and the unbalanced load are supplied.

Also, the present invention provides the proportional current controller capable of limiting the current output from the inverter to a rating, whereby a power failure of the inverter can be prevented.

Although the preferred embodiments of the present invention have been disclosed for illustrative purposes, those skilled in the art will appreciate that various modifications and changes are possible, without departing from the scope and spirit of the invention as disclosed in the accompanying claims.

The invention claimed is:

1. An inverter device for a microgrid, the inverter device comprising:
    a waveform detector detecting a voltage waveform and a current waveform applied to a load;
    a controller determining whether a sine wave appears based on the detected voltage waveform and the detected current waveform and performing voltage control or low order harmonic compensation depending on a determination result; and
    a switch generating a voltage waveform in a form of the sine wave by being turned on/off depending on a control signal received from the controller and supplying the generated voltage waveform in the form of the sine wave to the load,
    wherein the controller comprises:
        a load type determination controller determining that a type of the load is a fundamental wave when the sine wave appears in the detected voltage waveform and the detected current waveform, and determining that the type of the load is at least one of an unbalanced load or a non-linear load when the sine wave does not appear;
        a proportional-resonant controller controlling a voltage through a proportional-resonant control on a stationary reference frame when the type of the load is determined to be the fundamental wave; and
        a resonant controller compensating for a low order harmonic through a resonant control on the stationary reference frame when the type of the load is determined to be the unbalanced load and the non-linear load.

2. The inverter device of claim 1, wherein the proportional-resonant controller comprises:
    a first proportional-resonant controller controlling the voltage of a linear load due to the fundamental wave; and
    a second proportional-resonant controller controlling the voltage of the unbalanced load due to the fundamental wave.

3. The inverter device of claim 1, wherein the resonant controller comprises:
    a first resonant controller compensating for a third order hall ionic due to the unbalanced load;
    a second resonant controller compensating for a fifth order harmonic due to the non-linear load; and
    a third resonant controller compensating for a seventh order harmonic due to the non-linear load.

4. The inverter device of claim 1, wherein the controller further comprises:

a current limiting controller calculating an output current based on an output voltage and limiting the output current when the calculated output current exceeds a preset reference current.

5. The inverter device of claim 1, further comprising:
a gate driver controlling on/off of the switch based on the control signal from the controller in consequence of performing voltage control or low order harmonic compensation.

6. The inverter device of claim 1, further comprising:
a filter removing a harmonic component from the generated voltage waveform in the form of the sine wave in the switch.

7. The inverter device of claim 6, further comprising:
a transformer detecting a magnitude of the voltage supplied from the filter and transforming the detected voltage to a preset reference voltage.

8. A method for controlling an inverter device for a microgrid, the method comprising:
detecting, by a waveform detector, a voltage waveform and a current waveform applied to a load;
determining, by a controller, whether a sine wave appears based on the detected voltage waveform and the detected current waveform and performing voltage control or low order harmonic compensation depending on a determination result; and
generating, by a switch, a voltage waveform in a form of the sine wave by being turned on/off depending on a control signal received from the controller and supplying the generated voltage waveform in the form of the sine wave to the load,
wherein the determining of whether the sine wave appears comprises:
determining that a type of the load is a fundamental wave when the sine wave appears in the detected voltage waveform and the detected current waveform, and determining that the type of the load is at least one of an unbalanced load or a non-linear load when the sine wave does not appear;
controlling a voltage through a proportional-resonant control on a stationary reference frame when the type of the load is determined to be the fundamental wave; and
compensating for a low order harmonic through a resonant control on the stationary reference frame when the type of the load is determined to be the unbalanced load and the non-linear load.

9. The method of claim 8, wherein at the controlling of the voltage, the voltage is controlled in a case of a linear load due to the fundamental wave and in a case of the unbalanced load due to the fundamental wave.

10. The method of claim 8, wherein at the compensating for the low order harmonic, a third order harmonic is compensated for in a case of the unbalanced load, and a fifth order harmonic or a seventh order harmonic is compensated for in a case of the non-linear load.

11. The method of claim 8, wherein after the determining of whether the sine wave appears based on the detected voltage waveform and the detected current waveform and the performing of the voltage control or low order harmonic compensation depending on the determination result, further comprising:
calculating an output current based on an output voltage output from the controller, and limiting the output current when the calculated output current exceeds a preset reference current.

* * * * *